Figure 1:
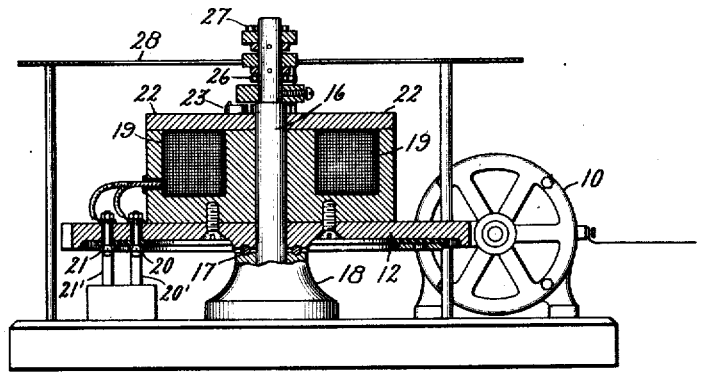

J. L. HALL.
SPEED INDICATOR.
APPLICATION FILED FEB. 28, 1906.

902,074.

Patented Oct. 27, 1908.
2 SHEETS—SHEET 1.

Witnesses:
George W. Tilden.
Helen Oxford

Inventor:
John L. Hall,
by Albert G. Davis
Att'y.

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

SPEED-INDICATOR.

No. 902,074.    Specification of Letters Patent.    Patented Oct. 27, 1908.

Application filed February 28, 1906. Serial No. 303,367.

*To all whom it may concern:*

Be it known that I, JOHN L. HALL, a citizen of the United States, residing at Schenectady, county of Schenectady, State of New York, have invented certain new and useful Improvements in Speed-Indicators, of which the following is a specification.

This invention relates to speed indicators and has for its object the provision of a device of this character which will accurately show at a glance the speed of the moving part to which it is applied, either in revolutions made or distance traveled in a given time; the arrangement being such that fractions of the indicator unit may be accurately shown, that high speeds may be attained without error or danger to the device and that speed will be indicated in either direction without change of connections and with equal accuracy and simplicity.

My speed indicator is preferably adapted for use at a point remote from the moving part the speed of which is to be indicated, and as a mode of transmitting the movements to a distant point I have found that the electric current furnishes a method which is extremely convenient, accurate and simple.

In carrying out my invention I provide, in connection with the shaft or other rotating part, a commutating device whereby a multi-phase current—preferably three-phase—is furnished to a motor of corresponding number of phases, so that the speed of rotation of the motor will be proportional to the speed of the shaft. Geared to the motor and constantly driven thereby is a revolving member provided with a magnetic clutch adapted to be periodically energized—say at intervals of five seconds—so as to lock the rotating member to a second member loosely mounted adjacent thereto but biased to return when released. This second member as it moves forward advances a pointer which is likewise spring returned, but which is normally prevented from returning by a brake or similar device which is not, however, sufficient to prevent its being advanced. The magnetic clutch is normally energized so as to advance the pointer for a definite period, at the end of which period a clock mechanism closes a contact for an instant to complete a circuit which withdraws the brake from the pointer, allowing the latter to assume a position corresponding to the speed during the preceding interval. The brake is only off for an instant, and immediately after it is again applied the magnetic clutch circuit is opened for an instant, allowing the pointer advancing mechanism to return to the zero position. The pointer is thus set at short intervals to correspond to the speed which may be in either direction and two pointers one for each direction may be employed, if desired.

My invention, therefore, consists in the features of construction and in the arrangement and combination of elements hereinafter set forth and particularly pointed out in the claims annexed to and forming a part of this specification.

Figure 2:
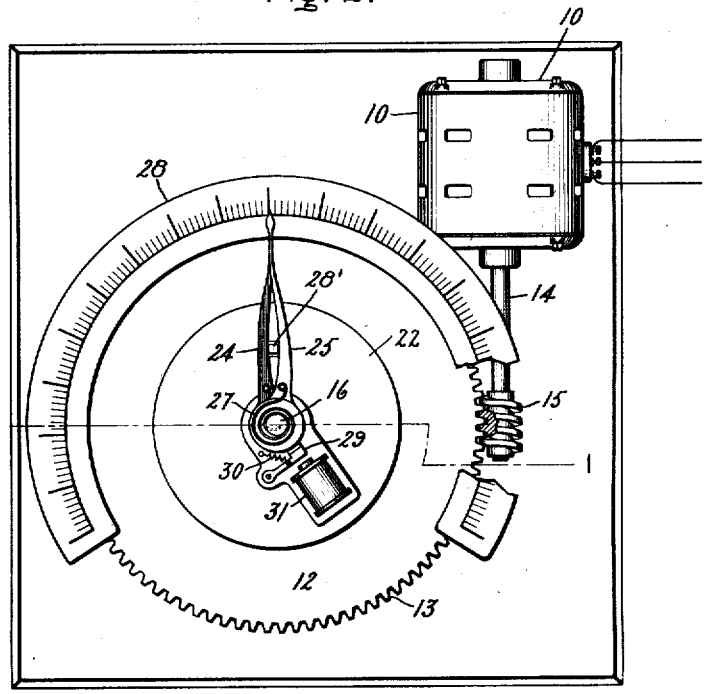
Figure 3:
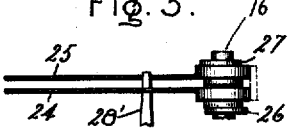
Figure 4:
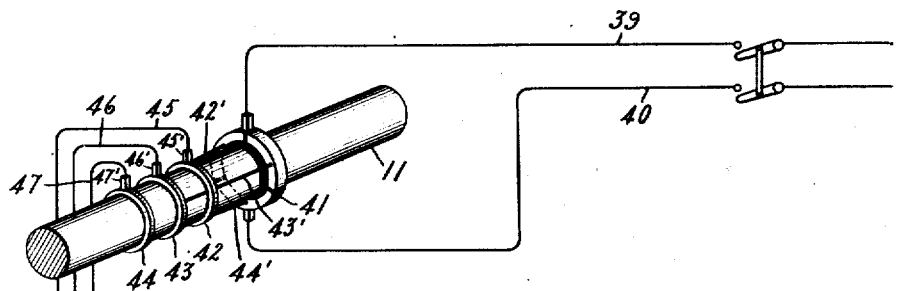
Figure 4:
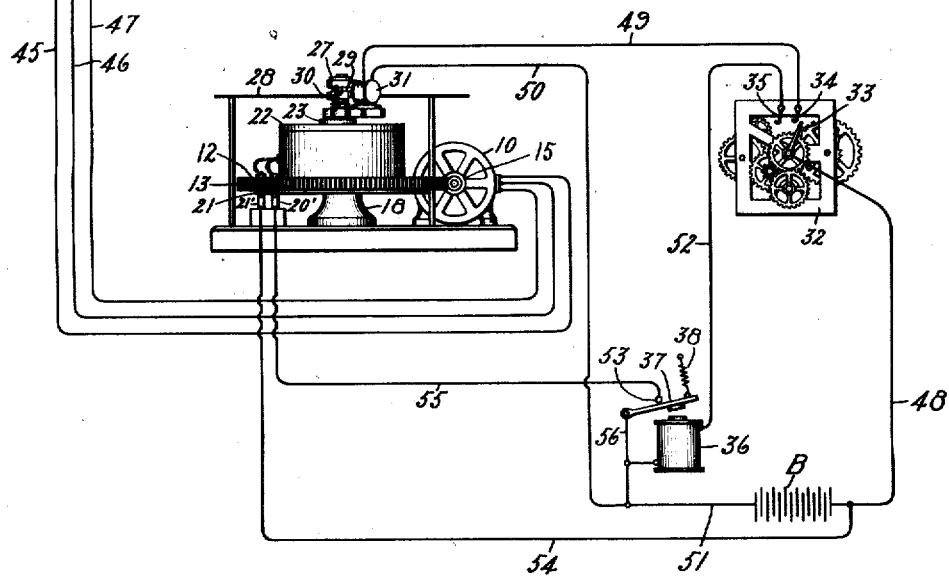

In the accompanying drawings, in which I have shown one embodiment of my invention, Figure 1 is a sectional view of my device on line 1—1 of Fig. 2; Fig. 2 is a plan view of the same, certain parts being broken away; Fig. 3 is a detail view showing the pointers; and Fig. 4 is a view showing the general arrangement of the parts and the electric circuits.

Referring to the drawings, 10 is an electric motor—preferably of the three-phase type—driven at a speed proportional to the speed of the shaft 11, the speed of which is to be indicated, by means hereinafter set forth. The motor is geared to a rotating member 12 having teeth 13 at its periphery by means of the shaft 14 and worm 15, so that the member 12 will be constantly rotated as the motor is driven. This member is mounted so as to rotate freely on the shaft 16, as by means of the ball bearings 17 between the member and the pedestal 18. Secured to the member 12, so as to rotate therewith, is a magnet 19, having its terminals secured to contact rings 20 and 21, secured to but insulated from the under side of the member 12. A second member 22 is loosely mounted upon the shaft 16 and adjacent to the magnet 19, so that when the magnet is energized it acts as a clutch to lock the member 22 to member 12 so that they will rotate together. The member 22 is spring-returned by means of the spring 23, so that when the magnetic clutch releases, it will return to the starting position. A pair of pointers 24 and 25, which may be distinguished from each other by different colors, as, for instance, black and red, are loosely mounted upon the shaft and also spring-returned by means of their respective springs 26 and 27. These pointers are arranged to move over a scale 28 which is calibrated to read in revolutions per minute, miles per hour, or in any desired unit. These pointers pass over the scale in opposite directions, so that one pointer,—as, for instance, pointer 25,—moving to the right indicates a forward direction, and pointer 24 will indicate a reverse direction. The member 22 is provided with a stud 28' which projects upward, so as to engage the pointers, as shown. A brake 29 is normally forced into contact with the hubs of the pointers by means of a spring 30. This brake is sufficient to keep the pointers from returning in response to the tensions of their springs, but is not sufficient to prevent the pointers from being advanced by the stud 28'. The brake 29 is controlled by a magnet 31, which at intervals is energized and attracts the brake 29 to release the pointers. Circuits of the magnets 31 and 19 are periodically made and broken by means of time switches, which may be an ordinary clock mechanism 32, as shown in Fig. 4, provided with a contacting arm 33, which successively engages the contacts 34 and 35. The circuit of the magnet 19 is normally closed, so that the closing of its corresponding contact 35 in the timing mechanism energizes a relay magnet 36, which attracts the armature 37 against the tension of the spring 38 to open the circuit of the magnet 19.

The circuit arrangements and method of operation are as follows: A direct current is supplied through the mains 39 and 40 to a three-part commutator 41, secured to but insulated from the shaft 11. The three parts of this commutator are respectively connected to the contact rings 42, 43 and 44 by conductors 42', 43' and 44'. These rings are connected by means of conductors 45, 46 and 47 and brushes 45', 46' and 47' with the motor 10, which in this instance is a three-phase motor. As the shaft revolves, the direct current in the mains 39 and 40 will be transmitted to the motor 10 in impulses having a three-phase relation, so as to revolve the motor at a speed proportionate to the speed of and in a direction corresponding to that of the shaft 11 in a manner well understood in the art. The motor will, therefore, be constantly rotated at a point remote from the shaft 11 at a speed proportionate to that of the shaft. The motor will drive the member 12 and the magnet 19, which, as before stated, is normally energized, and will, therefore, carry with it the member 22, which in turn will advance the pointers 24 or 25 in a direction corresponding to the direction of rotation of the motor. Let it be assumed that it is desired to set the pointer at intervals of five seconds. The rotation of the motor during these five seconds carries the pointer 25, for instance, around to the right a distance which on the scale will correspond to the speed of the shaft. At the end of this interval the contact arm 33 engages the contact 34 and closes a circuit as follows: from the battery B, through conductor 48 to contact arm 33 and contact 34, through conductor 49 to magnet 31, conductors 50 and 51, back to the battery. The pointers are thus relieved of the brake and allowed to respond to the tension of their respective springs. This contact is, however, only closed for an instant, and immediately thereafter the contact arm engages the contact 35, closing a circuit as follows: from the battery B, through conductor 48, contact arm 33, to contact 35, conductor 52, magnet 36, and conductor 51, back to the battery. The armature 37 is thus attracted against the tension of the spring 38, so as to open the circuit of the magnet 19 at the point 53, which circuit is as follows: from the battery B, through conductor 54, to contact ring 21 through brush 21', thence through the magnet 19, contact ring 20, and brush 20', conductor 55, armature 37, conductors 56 and 51, back to the battery. The magnet 19 being deënergized, the member 22 flies back to the starting position in response to the tension of its spring. Suppose, for instance, that the pointer is in a position indicating 80 revolutions and the speed is changed to 81 during the interval of five seconds. The motor will drive the member 12, which in turn will drive the pointer through a certain angular distance corresponding to 81 revolutions on the scale. The stud 28' will move the pointer ahead from the position it occupies to one corresponding to 81 revolutions. At the end of five seconds the contact is closed at 34, which energizes the magnet 31, to release the pointer. In this case, however, it is held from turning by the stud 28'. The contact then leaves 34, allowing the brake to again be applied, and passes to contact 35, deënergizing the magnet 19 and allowing the member 22 and stud 28' to return, the pointer being retained in the position at 81. Now, suppose that in the next five seconds speed changes to 79. The stud 28' is as before carried up to a position corresponding to 79 revolutions. At the end of five seconds the pointer is relieved of its brake and will fly back as far as the stud. The brake is then applied and the stud flies back to the starting position. In this way the pointer is made to correspond to the speed at the end of every interval of five seconds, and if a change has taken place the pointer is correspondingly moved. If the direction of rotation is reversed, the direction of rotation of the motor will be likewise reversed, which will reverse the direction of movement of the stud and thereby move the pointer 24 so as to indicate the speed of reversal. In the case of indicating speeds of a propeller on board ship, one pointer may be painted black to indicate the revolutions ahead and the other pointer may be red to indicate revolutions astern.

It is possible by the use of my device to indicate fractions of a revolution, which is very desirable in some cases, as, for instance, on trial trips, when the screws are being calibrated. Moreover, this device may be operated at a high speed without danger of error.

I have shown my invention as embodied in a certain specific type of mechanism and as arranged to operate in a definite way, but it should be clearly understood that I do not limit my invention to the particular construction nor to the mode of operation shown, except in so far as it is limited by the claims annexed hereto.

What I claim as new and desire to secure by Letters Patent of the United States, is,—

1. A speed indicator comprising a rotatable member and means whereby said member is constantly driven from the part the speed of which is to be indicated, a second member, means for periodically driving said second member with a continuous motion from said first member, an indicating device, and direct connection between the second member and the device for advancing the latter.

2. A speed indicator comprising a rotatable member and means whereby said member is constantly driven from the part the speed of which is to be indicated, a second member, electrically-controlled means for periodically driving said second member from said first member with a continuous motion, an indicating device, and direct connection between the second member and the device for advancing the latter.

3. A speed indicator comprising a constantly rotating member, a second member, electrically-controlled means for periodically driving said second member from said first member with a continuous motion, a spring-returned indicating device, means in connection with the second member for directly engaging the said device and advancing the same, and means for holding the device in advanced position.

4. A speed indicator comprising a constantly rotating member, a second member, electrically-controlled means for periodically driving said second member from said first member with a continuous motion, a spring-returned indicating device, direct connection between the second member and said device for advancing the latter, and electrically-controlled means for holding the device in advanced position and periodically releasing the same.

5. A speed indicator comprising a constantly rotating member, a spring-returned member, electrically-controlled means for periodically locking said members together and unlocking the members to release the same, a spring-returned indicating device, means in connection with the second member for advancing the said device, and means for holding the same in advanced position.

6. A speed indicator comprising a constantly rotating member, a spring-returned member, electrically-controlled means for periodically locking said members together and unlocking the same, a retracted indicating device, means in connection with the second member for advancing the said device, and electrically-controlled means for holding the device in advanced position and periodically releasing the same.

7. A speed indicator comprising a member adapted to be constantly rotated in one direction, a spring-returned indicating device, electromagnetically-controlled driving mechanism between said rotating member and said device for rotating the latter in the same direction, and a timing mechanism arranged to periodically close an electric circuit to operate the driving mechanism.

8. A speed indicator comprising a member adapted to be constantly rotated in one direction, a spring-returned member, electromagnetically-controlled driving mechanism between said members whereby they rotate together, a timing mechanism arranged to periodically close an electric circuit to operate the driving mechanism, an indicating device, and direct driving connections between said second member and the device for advancing the latter.

9. A speed indicator comprising a member adapted to be constantly rotated, a second member, electrically-controlled means for locking said members together, and a timing mechanism arranged to periodically close an electric circuit to operate said locking means.

10. A speed indicator comprising a member adapted to be constantly rotated, a spring-returned member, electromagnetic means for locking said members together, and a timing mechanism arranged to periodically open and close an electric circuit to operate said locking means.

11. A speed indicator comprising a member adapted to be constantly rotated in one direction, a spring-returned pointer, electromagnetically-controlled driving mechanism between said rotating member and said pointer for rotating the latter, an electromagnetically-controlled retaining device for said pointer, and timing mechanism arranged to make and break an electric circuit through the retaining and driving mechanisms successively.

12. A speed indicator comprising a member constantly rotating in one direction, a spring-returned member, electromagnetic driving mechanism between said members whereby they rotate together, a timing mechanism adapted to periodically close an electric circuit to energize said driving mechanism, a spring-returned pointer, means in connection with the spring-returned member for advancing said pointer, and means for retaining said pointer in advanced position when released by the advancing means.

13. A speed indicator comprising a constantly rotating member, a spring-returned member, electromagnetic driving mechanism between said members whereby they rotate together, a spring-returned pointer, direct driving connection between the spring-returned member and the pointer for advancing the latter, electrically-controlled means normally operating to retain the pointer in advanced position, and a timing mechanism arranged to make and break an electric circuit through the retaining and driving mechanisms successively.

14. A speed indicator comprising an electric motor, a rotatable member driven thereby, a spring-returned member, electromagnetic driving mechanism between said members whereby they rotate together, a spring-returned pointer advanced directly by said second member, an electrically-controlled device normally operating to prevent the return of said pointer, and a time switch arranged to release the pointer and its advancing member successively.

15. A speed indicator comprising an electric motor, a rotatable member driven thereby, a spring-returned member, electromagnetic driving mechanism between said members, a pair of spring-returned pointers adapted to be advanced in opposite directions by said second member, an electrically-controlled device normally operating to prevent the return of said pointers, and a time switch arranged to release the pointers and their advancing member successively.

In witness whereof, I have hereunto set my hand this 27th day of February, 1906.

JOHN L. HALL.

Witnesses:
BENJAMIN B. HULL,
HELEN ORFORD.